Nov. 20, 1962 N. L. MUENCH ET AL 3,064,468
METHOD AND APPARATUS FOR MEASURING PROPERTIES OF FLUID
Filed Sept. 8, 1958 3 Sheets-Sheet 1

INVENTORS.
NILS L. MUENCH,
JAMES A. RICKARD,
BY John J. Schneider
ATTORNEY.

Nov. 20, 1962   N. L. MUENCH ET AL   3,064,468
METHOD AND APPARATUS FOR MEASURING PROPERTIES OF FLUID
Filed Sept. 8, 1958   3 Sheets-Sheet 2
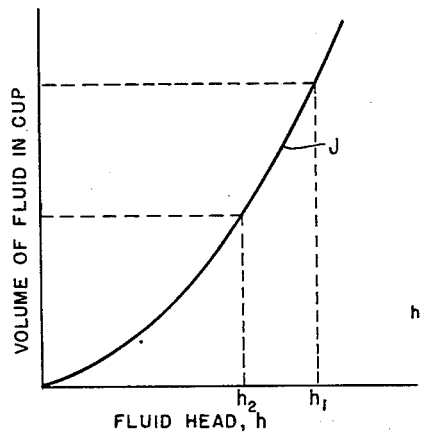
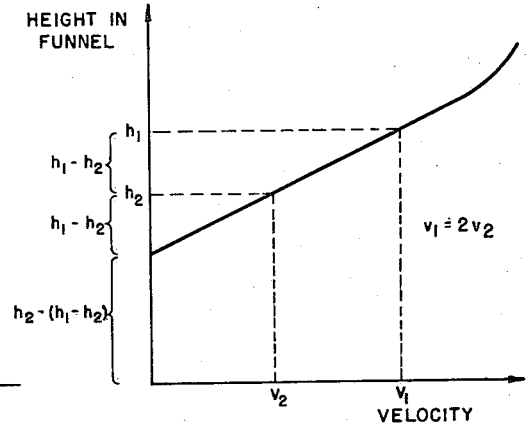
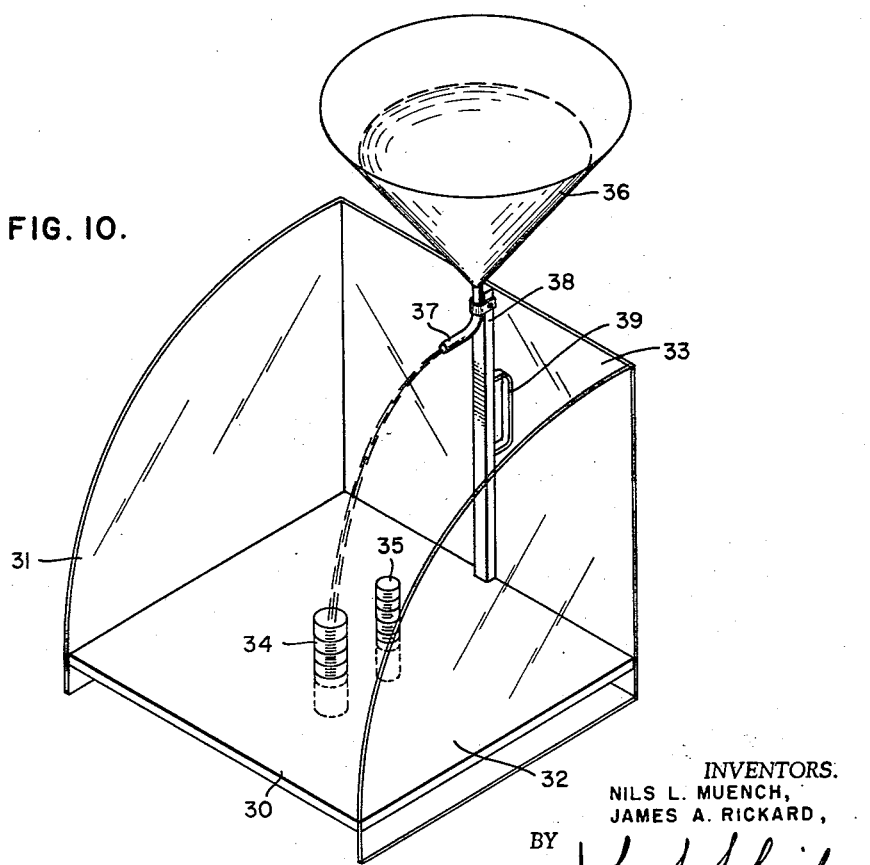
INVENTORS.
NILS L. MUENCH,
JAMES A. RICKARD,
BY John A. Schneider
ATTORNEY.

Nov. 20, 1962  N. L. MUENCH ET AL  3,064,468
METHOD AND APPARATUS FOR MEASURING PROPERTIES OF FLUID
Filed Sept. 8, 1958  3 Sheets-Sheet 3

INVENTORS.
NILS L. MUENCH,
JAMES A. RICKARD,
BY
ATTORNEY.

3,064,468
METHOD AND APPARATUS FOR MEASURING PROPERTIES OF FLUID

Nils L. Muench and James A. Rickard, Houston, Tex., assignors, by mesne assignments, to Jersey Production Research Company, Tulsa, Okla., a corporation of Delaware
Filed Sept. 8, 1958, Ser. No. 759,457
11 Claims. (Cl. 73—55)

This invention is directed to method and apparatus for measuring flow properties of liquids. More particularly, this invention is directed to method and apparatus for simultaneously and independently measuring the flow properties of non-Newtonian liquids used as well drilling fluids including the simultaneous and independent measurement of plastic viscosity and yield strength of a Bingham fluid.

A large number of different types of liquids are used in drilling well bores. To a greater or lesser extent all of these liquids perform some of the following functions: Keep the borehole free of cuttings; cool the bit and lubricate the drill pipe; maintain the wall of the borehole; control subsurface pressures; suspend the cuttings; and protect the well bore in order that maximum borehole information can be obtained by logging at a later time.

Drilling fluids are variously described as Newtonian or non-Newtonian depending upon whether or not they obey the simple flow laws proposed by Sir Isaac Newton. Non-Newtonian fluids may be further classified as Bingham, pseudo-plastic generalized non-Newtonian, etc., depending upon which set of flow equations describes their behavior.

The present invention is applicable to any type of liquid. However, a particular liquid, well drilling mud, has been selected to illustrate the invention in order to facilitate an understanding thereof. It is generally believed that drilling muds are well described by Bingham equations. Therefore, in much of the description of the invention to follow, Bingham fluid behavior is assumed. The method of analysis is equally adaptable to other fluids but the form of the equation will be different.

Bingham fluids are uniquely defined by two parameters: yield strength and plastic viscosity. In field operations the values of yield strength and plastic viscosity of the drilling fluid are very important because the behavior of the drilling fluid in the borehole is critically dependent thereupon. For example, a very viscous drilling fluid is extremely hard to pump and may produce subsurface formation breakdown because of the increased down-the-hole pressures caused thereby; or a drilling fluid with an extremely high yield strength is very difficult to start pumping and also may produce formation damage. Consequently, very careful control is maintained over the plastic viscosity and yield strength of the drilling fluids during drilling operations.

This control is normally exercised by treating the mud with chemical additives. Certain additives are used to vary the plastic viscosity while other additives are used to change the yield strength. Therefore, when treating a mud which has deteriorated from use, it is necessary to know whether or not the yield strength or the plastic viscosity has been altered so that the proper chemical additives can be mixed with the drilling fluid.

One common expedient in the art of well drilling is the use of a Marsh funnel to indicate qualitatively flow properties of the drilling fluid. The Marsh funnel is a simple funnel having a short tube connected to the narrowed end. In operation this funnel is filled with mud and the mud is allowed to flow out the bottom of the funnel and a measurement is taken of the time required to fill a quart jar. This operation is disadvantageous for it does not give an independent estimate of the plastic viscosity and yield strength but only measures the combined effects of these two variables. Therefore, the Marsh funnel is not entirely satisfactory as a field instrument.

Other devices and methods have been developed and used for measuring independently the values of yield strength and plastic viscosity. However, the instrumentations are relatively delicate and the procedures for their use are not simple. Therefore, while these devices are adequate for laboratory use, they are very seldom used in the field. Thus, no instrument for measuring plastic viscosity and yield strength in common laboratory use is readily adaptable for field use.

Accordingly, a principal object of the present invention is to provide apparatus and method that can be used to determine the flow properties of any liquid.

Another object of the present invention is to provide apparatus and method that can be used in the field for measuring the plastic viscosity and yield strength of drilling fluids.

A further object of the present invention is to provide a device for use in measuring plastic viscosity and yield strength of drilling fluids that is sufficiently rugged for routine field operations, that is simple in nature, that is easy for drilling crews to operate, that is inexpensive to construct, and that has little maintenance cost.

A brief description of the invention follows:

The apparatus for measuring flow properties of liquids comprises a first receptacle of selected configuration, a horizontally extending fluid conducting means having a selected cross section and length connected to the lower end of said first receptacle, second and third receptacles spaced a selected horizontal distance from each other and selected horizontal and vertical distances from the end of said conducting means arranged below said first receptacle and aligned with said conducting means such that liquid issuing from the end of said conducting means at selected velocities will enter said second and third receptacles.

One embodiment of the apparatus of the invention provides for configuring the first receptacle other than of uniform cross-section.

Supporting means for the receptacles is provided. This means may be employed to shield the liquid flow from the first receptacle to the other receptacles.

The invention is also to be considered as including employment of a plurality of receptacles instead of just the two receptacles mentioned supra as the second and third receptacles.

The method of the invention for measuring flow properties of liquids utilizes the apparatus of the invention and comprises the steps of placing liquid to be measured in the first receptacle and permitting the liquid to flow freely through the conducting means and into the second and third receptacles, observing the fluid head in the first receptacle when liquid enters the second receptacle and the fluid head in the first receptacle when liquid enters the third receptacle, and then plotting fluid head vs. fluid velocity for the second and third receptacles, the resulting curve indicating flow properties of the liquid.

In this method if the first receptacle is configured other than of uniform cross-section instead of observing fluid heads the values of the volumes contained in the second and third receptacles may be used instead of the values of the fluid heads. As in the case of the apparatus invention instead of two receiving receptacles several may be employed.

The above objects and other objects of the invention will be apparent from a more detailed description of the invention taken in conjunction with the drawings wherein:

FIG. 5 is a calibration curve plot of volume of fluid in the receiving receptacles vs. fluid head;

FIG. 6 is a plot of fluid head vs. velocity illustrating explanation of the invention;

FIG. 10 is an isometric view of the apparatus of the invention.

Figure 1:
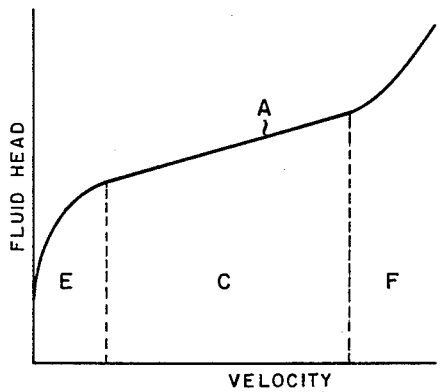
FIG. 1 is typical of an actual drilling mud plot of fluid head vs. velocity.
Figure 2:
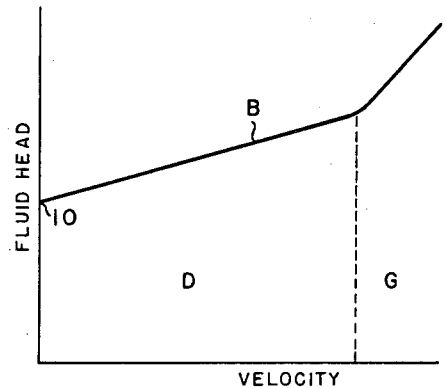
FIG. 2 is an approximate theoretical Bingham curve plot of the fluid head vs. velocity.

Drilling fluid commonly consists principally of water and suspended clay solids. The behavior of a mud mixture of this type is commonly described as Bingham behavior. This description is usually reasonably accurate because the actual mud behavior, curve A of FIG. 1, is similar to the theoretical Bingham curve, curve B of FIG. 2, at least in the laminar flow regions C and D of FIGS. 1 and 2, respectively. In FIG. 1, three distinct regions are shown, E the variable viscosity region; C the laminar flow region; and F the turbulent flow region. In the theoretical Bingham curve plot of FIG. 2, G designates the turbulent flow region. Curve B of FIG. 2 yields information relating to yield strength and viscosity of the mud. The yield strength is defined as the intersection 10 of the straight line laminar flow curve B with the vertical axis. The plastic viscosity is defined as the scope of curve B in the laminar flow region D.

Figure 3:
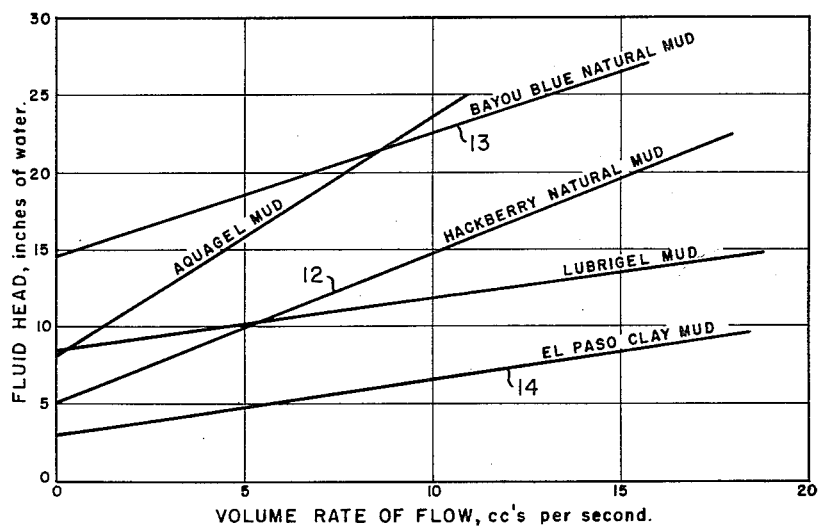
FIG. 3 is a plot of fluid head vs. volume rate of flow for various drilling muds.

The curves of FIG. 3 illustrate the manner in which various muds flow from a Marsh funnel which has been modified by adding a six inch long horizontal tube to the outflow end of the funnel. The addition of the horizontal tube is necessary to insure that the kinetic or Bernoulli pressure drop which always occurs when fluid enters any orifice and which is independent of fluid velocity) is small compared to the viscous pressure drop (which occurs when a viscous fluid flows through a tube or capillary). However, the data of FIG. 3, although adequate to determine mud viscosity and yield, can be obtained only by accurately timing the rate of fall of the mud level in the funnel, and then obtaining from this data instantaneous rate of flow as a function of hydrostatic head. This method and apparatus is not adaptable to field use for the determination of drilling mud properties because both time and the mud level must be accurately and simultaneously measured, calculations performed, and the data plotted on a graph.

To simplify this procedure by eliminating the necessity for simultaneous time and level determinations, two measurements may be made with the Marsh funnel. For example, the time for a first pint of liquid to flow and then the time for a second pint of liquid to flow may be measured. This is equivalent to measuring a volume rate of flow at one fluid head, for example, 15 inches of liquid, and at a second fluid head, for example, 10 inches of liquid. Thus, two data points are obtained and a curve similar to the curves of FIG. 3 can be drawn through the two data points. However, while this procedure may be acceptable for the Hackberry natural mud, curve 12, it would not be acceptable for the Bayou Blue natural mud, curve 13, or the El Paso clay mud, curve 14. Therefore, unless the exact characteristics of the liquid are known, it is impossible to select a proper fluid head in advance.

An alternate procedure may be considered in that a given flow rate may be selected and the corresponding fluid head measured. Thus, an examination of FIG. 3 reveals that the selection of flow rates of 5 and 10 cc. per second should be adequate for all the muds illustrated. Therefore, it would be possible to obtain two points of the curve in the desired region if it were possible to measure the fluid head corresponding to the particular volume flow rates of 5 and 10 cc. per second. Unfortunately, however, instantaneous measurements of volume flow rate are difficult to obtain and the complex procedures necessary precludes their use in ordinary drilling operations employing ordinary measuring instruments. Thus, the plastic viscosity and yield strength of the drilling muds may be measured in the field if measurement of the volume flow rate and simultaneous measurement of the fluid head of drilling mud in a funnel could be easily made.

Figure 4:
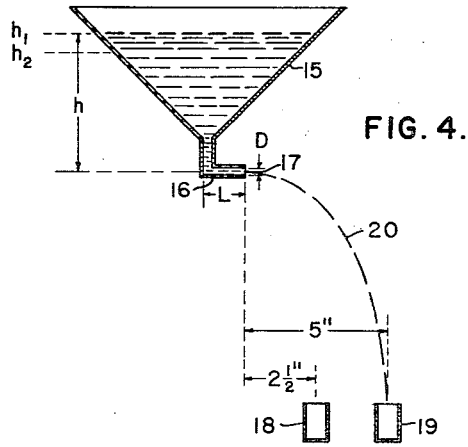
FIG. 4 is a schematic illustration of the basic principles of the invention.

Reference is made to FIG. 4 wherein is shown a funnel 15 to which is connected at the lower narrow end thereof a horizontally extending tube 16 provided with an orifice or opening 17. Positioned below tube 16 are two cups or receptacles 18 and 19 spaced selected vertical and horizontal distances from opening 17 and horizontal distances from each other. Drilling mud passing through opening 17 is thrust outwardly by the fluid head, designated $h$, and follows a parabolic course as indicated at 20. The velocity of the drilling mud in the horizontal direction is a function of the fluid head $h$, the geometry of the horizontal outflow tube 16, and the fluid properties of the mud. The velocity in the vertical direction is governed by ordinary equations of gravitational attraction. However, regardless of the fluid head $h$ and the mud properties, all fluids having a given horizontal velocity will follow identical parabolic paths. Therefore, cup 18 positioned at a selected place will always collect liquid having a given velocity and cup 19 located at a different selected place will collect liquid having a different given velocity. The volume rate of flow of liquid from funnel 15 is proportional to the velocity of the liquid; the faster the velocity the greater the volume rate of flow of the liquid. Therefore, by locating cups 18 and 19 at selected positions relative to funnel 15, volume rates of flow corresponding to 5 and 10 cc. per second or any other desired rates of flow may be selected.

To obtain an experimental curve similar to the curves of FIG. 3, it is also necessary to know the fluid head, $h$, at each of the predetermined volume rates of flow. The fluid heads may be obtained by observing the height of the liquid in the funnel at the time the stream enters cup 19, $h_1$, and at the time the stream enters cup 18, $h_2$. The curve may be plotted from this information. However, a more accurate and convenient method for measuring the fluid heads is possible by configuring the receptacle 15 in any shape other than one wherein the cross section is uniform. In this manner the amount of liquid obtained by lowering the fluid head $h$ a given amount will vary. In a conically shaped funnel, for example, the amount of liquid obtained by lowering the height from $h_1$ to $h_2$ is proportional to the square of the average $h$ in the region between $h_1$ and $h_2$. On the other hand, if the funnel were wedge shaped, that is, a funnel having two slanted sides and two flat parallel sides, the amount of liquid obtained would be proportional to the average $h$. Another expression would apply for a spherically shaped funnel. Therefore, the volumes of the liquid collected in cups 18 and 19 provide the average height of the fluid head at the time the liquid stream is falling in the cups. A simple calibration procedure relates directly the volume of fluid in the cup with the fluid head. A typical calibration curve J is illustrated in FIG. 5.

The force tending to flow the liquid out of opening 17 is a function of the density of the liquid as well as of the other factors mentioned supra. Therefore, calibration curve J of FIG. 5 is correct only for a liquid of one particular density. Corrections for different liquid densities may be made by compiling a series of calibration curves or by adjusting the values of the fluid head $h$ so that one calibration curve would be accurate for a series of abscissae on the plot of FIG. 5 or by other similar and appropriate methods.

Another phenomenon has a minor effect on the data obtained. This is the Bernoulli effect; that is, a viscosity independent and velocity dependent pressure reduction which occurs at the entrance for opening 17 of horizontal tube 16. This effect is slightly different for cups 18 and 19 since it is velocity dependent. Routine calibration procedures will determine this effect and the effect may be compensated for by adjusting the relative positions of cups 18 and 19 either in a horizontal or vertical direction.

FIG. 6 illustrates the manner in which the data is utilized to determine viscosity and yield strength. The location of points $v_1$ and $v_2$ on the abscissa is predetermined by the geometry, distances, and calibration of the system. In practice it may be desirable to position the two or more receptacles 18 and 19 in such positions that they collect liquids, the velocities of which in tube 16 have a ratio of 2:1. Points $v_1$ and $v_2$ have magnitudes in the ratio of 2:1 and may correspond, for example, to volume rates of flow of 10 and 5 cc. per second as per FIG. 3. The experimental values $h_1$ and $h_2$ are plotted upward from points $v_1$ and $v_2$, respectively. The points located thereby are connected by a straight line. The intercept and slope of this line gives the yield strength and plastic viscosity, respectively. Alternatively, the yield strength and plastic viscosity may be ascertained in that (1) plastic viscosity=$(h_1-h_2)K_1$ and (2) yield strength=$[h_2-(h_1-h_2)]K_2$. Here, the constants $K_1$ and $K_2$ may be determined by simple calibration with known liquids.

Thus, the measurement of fluid properties is accomplished by flowing the liquid through horizontal tube 16 at a measured pressure and velocity. The pressure is determined my the height of the liquid in funnel 16. The velocity is determined indirectly by the location of cups 18 and 19 below funnel 15. The relationship between the fluid flow parameters and the pressure loss and velocity is known to those practiced in the art. For example, the following equation applies to Bingham plastic fluid and also in the limiting case of $t_o=0$ to Newtonian fluids:

$$\frac{P}{L}=\frac{t_o}{D}+\frac{\mu_p v}{D^2}$$

where $P$ is pressure, $t_o$ is yield strength, $\mu_p$ is plastic viscosity, $v$ is average linear velocity, $D$ is the inside diameter of tube 16, and $L$ is the length of tube 16. Equivalent expressions can be written for fluids of other rheological classes.

The above relation known as the "Buckingham-Reiner" equation is used to illustrate the analytic foundation of the invention as follows:

Since two parameters ($\mu_p$ and $t_o$) are adequate to describe a Bingham plastic fluid, only two measurements are required. For more complex fluids more than two measurements may be necessary. If the two measurements correspond to average linear velocities in tube 16 of $v_1$ and $v_2$ and two pressures determined by the height in the funnel denoted by $P_1$ and $P_2$, the following set of simultaneous equations is obtained:

$$\frac{P_1}{L}=\frac{t_o}{D}+\frac{\mu_p v_1}{D^2}$$

and $$\frac{P_2}{L}=\frac{t_o}{D}+\frac{\mu_p v_2}{D^2}$$

Solving simultaneously $$\mu_p=\frac{\frac{P_1}{L}-\frac{P_2}{L}}{\frac{v_1}{D^2}-\frac{v_2}{D^2}}$$

Substituting the relation $P=\rho g h$ (where $\rho$ denotes fluid density and $g$ is the acceleration of gravity) between the pressure and the height $h$ of the fluid in the funnel (neglecting kinetic effects) the following expressions are obtained for plastic viscosity:

$$\mu_p=\frac{\rho g D^2}{L}\left[\frac{h_1-h_2}{v_1-v_2}\right]$$

and $$\mu_p=K_1\rho[h_1-h_2]$$

where $K_1$ is some constant determined by $D$, $L$, $v_1$ and $v_2$.

The expression for $t_o$ can be obtained by an inspection of FIG. 6 wherein is illustrated the special case in which $v_1=2v_2$:

$$t_o=\frac{\rho g D}{L}[h_2-(h_1-h_2)]$$

$$t_o=K_2\rho[h_2-(h_1-h_2)]$$

where $K_2$ is some constant determined by $D$ and $L$.

By proper choice of $D$, $L$, $v_1$ and $v_2$ (that is, by proper choice of $D$, $L$, and cup locations), the constants $K_1$ and $K_2$ can be made equal to unity so that the final expressions given below are obtained:

$$\mu_p=\rho[h_1-h_2]$$

$$t_o=\rho[h_2-(h_1-h_2)]$$

The above two equations are not yet in a final and convenient form because by the method disclosed herein, it is not the height of the liquid in funnel 15 which is measured directly but rather the height of the liquid caught in cups 18 and 19. In addition some convenient means must be provided for taking into account variations in density $\rho$. Several different means may be used to obtain the desired form.

Figure 7:
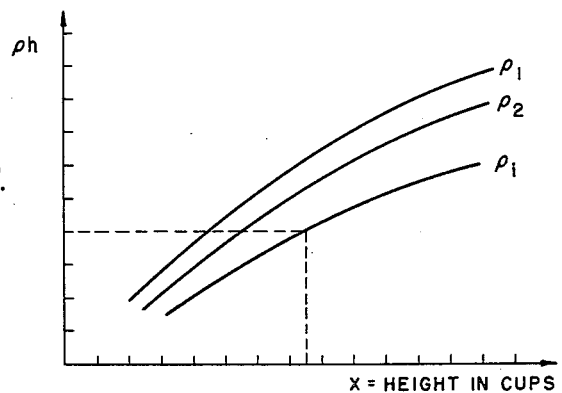
FIG. 7 is a plot of the quantity "$\rho h$" vs. height of liquid in the receptacles or cups for various liquid density curves.

Thus as illustrated in FIG. 7, one method provides for determining a series of calibration curves $\rho_1$, $\rho_2$, $\rho_i$, which relate the height $x$ of the liquid in the cups to the quantity $\rho h$ for various values of density.

Figure 8:
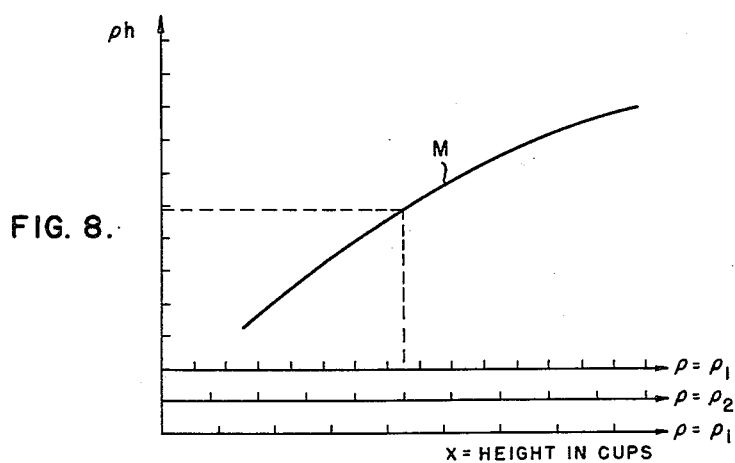
FIG. 8 is a plot similar to FIG. 7 of the quantity "$\rho h$" vs. liquid height in the cups utilizing a multiplicity of scales corresponding to different density values.

Another method is illustrated in FIG. 8. This method is similar to the first described method; however, instead of employing a family of curves, $\rho_1$, $\rho_2$, $\rho_i$, for different values of density, a multiplicity of scales, $\rho_1$, $\rho_2$, $\rho_i$, corresponding to different values of density is employed. Only one curve, M, is required here.

Figure 9:
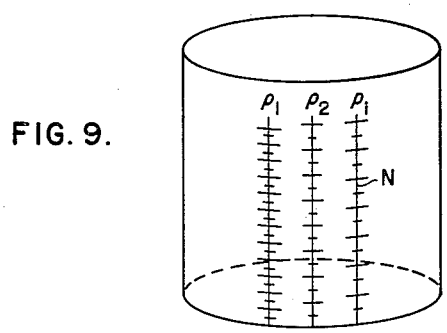
FIG. 9 illustrates a cup provided with various scales designating different liquid densities.

A still further method eliminates the need for the conversion graph of FIGS. 7 and 8. Instead the parameters of the funnel measuring system are designed so that the quantity, $\rho h$, is directly proportional to the height of the liquid in the cup. This is illustrated in FIG. 9 wherein the conversion means are placed directly on the cup itself as indicated by the scales N. A multiplicity of scales is still required corresponding to various values of density $\rho_1$, $\rho_2$, $\rho_i$, however, the appropriate value of $\rho h$ can be read directly from the scale of the cup corresponding to the particular liquid density.

FIG. 10 illustrates the complete apparatus of the invention. Herein is shown a base member 30 to which are affixed transparent or opaque side members 31 and 32 and back member 33. Two cups 34 and 35 on which scales may be placed are secured to base member 30. A funnel 36 to which is affixed a horizontally extending tube 37 is secured to an upright supporting member 38 connected to back member 33. A handle 39 may be provided on support 38.

If the vertical distance between cups 34 and 35 and funnel 36 is about 1 foot and cups 34 and 35 are displaced horizontally about 5 inches and 2½ inches, respectively, from the open end of tube 37 (note FIG. 4), calculations show collection of fluids having horizontal velocities of 25 and 50 cc. per second, respectively, results. If the tube 37 has a diameter of approximately 0.185 inch, then the volume rates of flow are 5 and 10 cc. per second, respectively.

As mentioned supra, other geometric relationships are to be considered within the scope of the invention. Other geometries are possible, both for the funnel 36 and for cups 34 and 35. For example, if extremely accurate measurements are desired of low quantities of mud, cups 34 and 35 may be configured V-shaped, conically shaped, etc.

Side members 31 and 32 and back member 33 provide shields which protect the stream of mud flow from wind. If desired, a calibration curve such as illustrated in FIG. 8 may be engraved on side members 31 and 32 to provide a convenient reference.

If greater accuracy is desired or if the detailed nature of the curve of FIG. 6 is required then a larger number of collecting cups than the two described may be employed.

Having fully described the apparatus, method of operation and objects of the invention, we claim:

1. Apparatus for measuring fluid properties comprising a first receptacle of selected configuration, a horizontally extending fluid conducting means having a selected cross-section and length connected to the discharge end of said first receptacle, second and third receptacles spaced a selected horizontal distance from each other and selected horizontal and vertical distances from said conducting means arranged below said first receptacle and aligned with said conducting means such that fluid issuing from said conducting means at selected velocities enters said second and third receptacles.

2. Apparatus as recited in claim 1 wherein said first receptacle has other than a uniform cross-section.

3. Apparatus as recited in claim 2 wherein means for supporting said first, second, and third receptacles is provided, said supporting means also being adapted to shield said fluid flow.

4. Apparatus as recited in claim 3 wherein said first receptacle is a Marsh funnel.

5. Apparatus for measuring fluid properties comprising a receptacle of selected configuration, a horizontally extending fluid flow conducting means having a selected cross-section and length connected to the lower discharge end of said receptacle, a plurality of cups spaced selected horizontal distances from each other and selected horizontal and vertical distances from said conducting means arranged below said receptacle and aligned with said conducting means such that fluid issuing from said conducting means at selected velocities enters said cups.

6. Apparatus as recited in claim 5 wherein said receptacle has other than a unform cross-section.

7. Apparatus as recited in claim 7 wherein means for supporting said receptacle and cups is provided, said supporting means also being adapted to shield said fluid flow.

8. Apparatus as recited in claim 7 wherein said receptacle in a Marsh funnel.

9. A method for measuring the flow properties of viscosity and yield strength of a liquid employing a first receptacle of selected configuration, a horizontally extending liquid conducting means having a selected cross-section and length connected to the lower discharge end of said first receptacle, second and third spaced-apart receptacles spaced selected horizontal and vertical distances from said conducting means arranged below said first receptacle and aligned with said conducting means such that liquid issuing from said conducting means at selected velocities enters said second and third receptacles comprising the steps of placing liquid, the flow properties of which are to be measured, in said first receptacle and then flowing the liquid through said conducting means, determining the fluid head in said first receptacle at the moment of entry of said liquid flowing through said conducting means in said second receptacle, determining the fluid head in said first receptacle at the moment of entry of said liquid flowing through said conducting means in said third receptacle and then plotting fluid head vs. fluid velocity for said second and third receptacles, the slope of the resulting curve indicating said flow property of viscosity and the intersection of the resulting curve and the fluid head axis indicating said flow property of yield strength of said liquid.

10. A method for measuring flow properties of viscosity and yield strength of a fluid employing a receptacle of selected configuration, a horizontally extending fluid conducting means having a selected cross-section and length connected to the lower discharge end of said receptacle, a plurality of cups spaced-apart from each other and spaced selected horizontal and vertical distances from said conducting means arranged below the receptacle and aligned with said conducting means such that fluid issuing from said conducting means at selected velocities enters said cups comprising the steps of placing fluid, the flow properties of which are to be measured, in said receptacle and flowing the fluid through the conducting means, determining the fluid heads in said receptacle at the moment of entry of said fluid flowing through the conducting means in each of said cups and then plotting fluid head vs. fluid velocity for each of the cups, the resulting curve indicating the flow properties of viscosity and yield strength of said fluid.

11. A method for measuring flow properties of viscosity and yield strength of fluid employing a receptacle of selected configuration, a horizontally extending fluid conducting means having a selected cross-section and length connected to the lower discharge end of the receptacle, a plurality of cups space-apart from each other and spaced selected horizontal and vertical distances from the conducting means arranged below the receptacle and aligned with the conducting means such that fluid issuing from the conducting means at selected velocities enters said cups comprising the steps of placing fluid, the flow properties of which are to be measured, in the receptacle and flowing said fluid through the conducting means and determining the volume of fluid collected in each of said cups and the fluid velocities for each of said cups, said volumes of fluid collected and said fluid velocities indicating the flow properties of viscosity and yield strength of said fluid.

References Cited in the file of this patent

UNITED STATES PATENTS

| | | |
|---|---|---|
| 1,161,168 | Trimby | Nov. 23, 1915 |
| 2,343,303 | Simmons | Feb. 29, 1944 |
| 2,381,602 | Larson | Aug. 7, 1945 |